US009586598B2

(12) United States Patent
Iguchi et al.

(10) Patent No.: US 9,586,598 B2
(45) Date of Patent: Mar. 7, 2017

(54) INFORMATION PROVIDING APPARATUS

(71) Applicant: FUJITSU TEN LIMITED, Kobe-shi, Hyogo (JP)

(72) Inventors: Yusuke Iguchi, Kobe (JP); Yoshihiro Nakao, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days.

(21) Appl. No.: 14/750,054

(22) Filed: Jun. 25, 2015

(65) Prior Publication Data
US 2016/0009296 A1 Jan. 14, 2016

(30) Foreign Application Priority Data

Jul. 9, 2014 (JP) ................................. 2014-141207

(51) Int. Cl.
*B60W 50/14* (2012.01)
*G07C 5/08* (2006.01)
*G07C 5/00* (2006.01)

(52) U.S. Cl.
CPC ........... *B60W 50/14* (2013.01); *G07C 5/0808* (2013.01); *B60W 2050/146* (2013.01); *B60W 2550/40* (2013.01); *B60W 2550/402* (2013.01); *G07C 5/008* (2013.01); *G07C 5/0816* (2013.01)

(58) Field of Classification Search
CPC ...... B60W 50/14; B60W 50/10; B60W 30/09; B60R 11/0229
USPC ............. 701/36, 301, 29.4; 296/24.34, 37.12
See application file for complete search history.

(56) References Cited

U.S. PATENT DOCUMENTS

| 8,140,213 | B2* | 3/2012 | Boss | G07C 5/008 340/439 |
|---|---|---|---|---|
| 9,224,053 | B1* | 12/2015 | Ferguson | G06K 9/00798 |
| 2001/0034220 | A1* | 10/2001 | Berstis | G11B 27/002 455/186.1 |
| 2011/0246246 | A1* | 10/2011 | Johnson | G06Q 10/02 705/5 |
| 2013/0134730 | A1* | 5/2013 | Ricci | G06F 9/54 296/24.34 |
| 2013/0154298 | A1* | 6/2013 | Ricci | B60R 11/0229 296/37.12 |
| 2014/0379247 | A1* | 12/2014 | Ferguson | B60W 30/09 701/301 |
| 2015/0274178 | A1* | 10/2015 | Tsuyunashi | B60W 30/095 701/36 |

(Continued)

FOREIGN PATENT DOCUMENTS

JP 2008-261703 A 10/2008
JP 2011-081743 A 4/2011

*Primary Examiner* — Thomas G Black
*Assistant Examiner* — Wae Louie
(74) *Attorney, Agent, or Firm* — Oliff PLC

(57) ABSTRACT

In an information providing apparatus, a controller is configured to: (i) acquire traveling environment information indicating a traveling environment of the vehicle; (ii) acquire, from a predetermined server via a network, a determination condition that is used to determine whether or not use of a vehicle function included in the vehicle is suitable; and (iii) provide, to a user of the vehicle, a message suggesting use of the vehicle function in a case where the traveling environment indicated by the acquired traveling environment information satisfies the acquired determination condition.

18 Claims, 15 Drawing Sheets

(56) References Cited

U.S. PATENT DOCUMENTS

2016/0009296 A1* 1/2016 Iguchi .................. B60W 50/14
701/36

* cited by examiner

| USER ID | LOCATION | TIME AND DATE | TYPE OF ROAD | PRESENCE OR ABSENCE OF TRAFFIC CONGESTION | WEATHER | ... |
|---|---|---|---|---|---|---|
| A01234 | N 34.725848 E135.304098 | 2014/12/07 07:07 | HIGHWAY | ABSENCE | SUNNY | ... |
| E06435 | N 35.068924 E135.934610 | 2014/12/07 07:12 | LOCAL STREET | ABSENCE | CLOUDY | ... |
| B03436 | N 35.837906 E139.881706 | 2014/12/07 07:24 | HIGHWAY | ABSENCE | RAINY | ... |
| A07237 | N 35.031543 E136.723309 | 2014/12/07 07:33 | LOCAL STREET | ABSENCE | SUNNY | ... |
| C02962 | N 42.819077 E141.617889 | 2014/12/07 07:36 | HIGHWAY | ABSENCE | SNOWY | ... |
| ... | ... | ... | ... | ... | ... | ... |

| VEHICLE FUNCTION NAME | PREDETERMINED FUNCTION | TIME PERIOD | TYPE OF ROAD | PRESENCE OR ABSENCE OF TRAFFIC CONGESTION | WEATHER | ... |
|---|---|---|---|---|---|---|
| ACC | No | — | HIGHWAY | ABSENCE | — | ... |
| LKA | No | — | HIGHWAY | — | — | ... |
| SNOW MODE | No | — | — | ABSENCE | SNOWY | ... |
| NIGHT VISION | Yes | NIGHT | LOCAL STREET | — | — | ... |
| ... | ... | ... | ... | ... | ... | ... |

FIG.11

INFORMATION PROVIDING APPARATUS

BACKGROUND OF THE INVENTION

Field of the Invention

The invention relates to a technology that provides information to a user of a vehicle.

Description of the Background Art

Recently, vehicles, such as cars, include various apparatuses and devices to provide specific vehicle functions, such as ACC and LKA. Those vehicle functions are effective to reduce load of users (mainly driver) of the vehicles and to improve convenience. However, there is a case where some users do not understand situations suitable for use of the vehicle functions. Therefore, information providing apparatuses are known that suggest the use of the vehicle functions once the vehicle is in the situation suitable for the use of the vehicle functions.

However, conventional information providing apparatuses internally store determination conditions used by the information providing apparatus to determine whether or not the use of the vehicle function is appropriate. Thus, suitability of the use of the vehicle function is determined rigidly and it is impossible to suggest the use of the vehicle function flexibly, according to environment and a position of the vehicle.

For example, suitability of the use of the vehicle function (e.g. ACC) is determined based on whether or not the vehicle is traveling on a highway (freeway). However, even in a case where the vehicle is traveling on a road other than a highway, there is a situation suitable for the use of the vehicle function. The conventional information providing apparatus rigidly determines that in the case where the vehicle is traveling on a road other than a highway, the use of the vehicle function is not suitable. Thus, even in a case where the vehicle is in the situation suitable for the use of the vehicle function, the information providing apparatus cannot appropriately suggest the use of the vehicle function.

SUMMARY OF THE INVENTION

According to one aspect of the invention, an information providing apparatus that is used in a vehicle includes: a controller configured to: (i) acquire traveling environment information indicating a traveling environment of the vehicle; (ii) acquire, from a predetermined server via a network, a determination condition that is used to determine whether or not use of a vehicle function included in the vehicle is suitable; and (iii) provide, to a user of the vehicle, a message suggesting use of the vehicle function in a case where the traveling environment indicated by the acquired traveling environment information satisfies the acquired determination condition.

Since whether or not the use of the vehicle function is suitable is determined based on the determination conditions acquired from the server, the use of the vehicle function can be appropriately suggested.

According to another aspect of the invention, the information providing apparatus further includes a location acquisition system configured to acquire a current location in which the vehicle is currently located. The controller, in (i), acquires the traveling environment information indicating the traveling environment of the acquired current location and, in (ii), acquires the determination condition according to the acquired current location.

Since whether or not the use of the vehicle function is suitable is determined based on the current location of the vehicle, the use of the vehicle function can be more appropriately suggested.

According to another aspect of the invention, the information providing apparatus further includes a location derivation system configured to derive a scheduled location through which the vehicle will travel. The controller, in (i), acquires the traveling environment information indicating the traveling environment of the derived scheduled location and, in (ii), acquires the determination condition according to the derived scheduled location.

Since whether or not the use of the vehicle function is suitable is determined based on the scheduled location of the vehicle, the use of the vehicle function can be suggested beforehand.

Therefore, an object of the invention is to appropriately suggest use of a vehicle function.

These and other objects, features, aspects and advantages of the invention will become more apparent from the following detailed description of the invention when taken in conjunction with the accompanying drawings.

BRIEF DESCRIPTION OF THE DRAWINGS

FIG. 5 illustrates an example of per-function data;

FIG. 11 illustrates an example of a determination condition table in a second embodiment;

DESCRIPTION OF THE EMBODIMENTS

Embodiments of the invention are hereinafter described with reference to the drawings.

1. First Embodiment

1-1. System Outline

Figure 1:
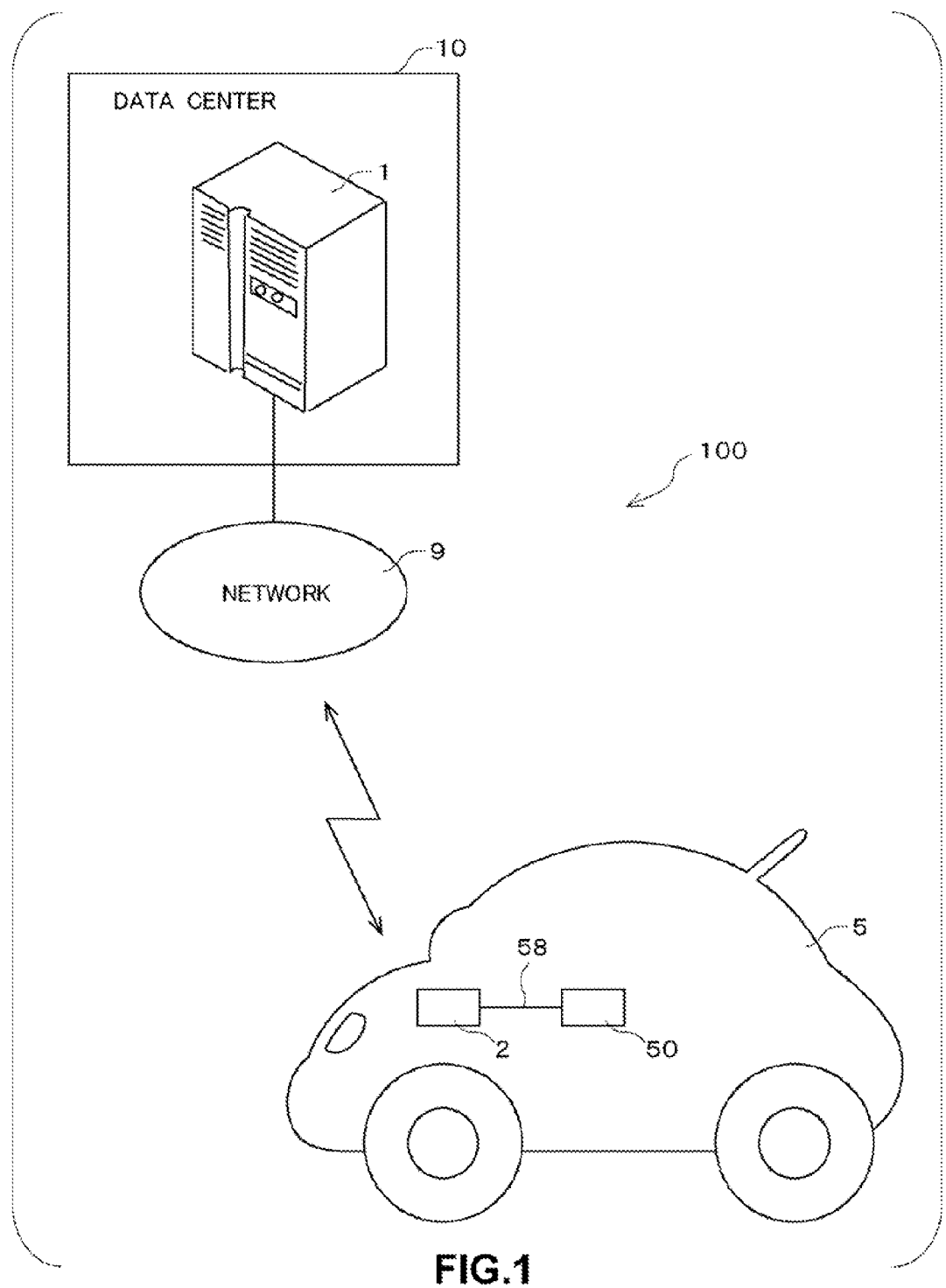
FIG. 1 illustrates an outline of a communication system.

FIG. 1 illustrates an outline of a communication system 100 in this embodiment. The communication system 100 includes: a server 1 that is installed in a data center 10, a facility for accumulating data about a vehicle 5, such as a car; and an information providing apparatus 2 that is mounted on the vehicle 5. The server 1 and the information providing apparatus 2 communicate with each other via a network 9, such as the Internet.

FIG. 1 shows only one vehicle 5. However, the plural vehicles 5 are actually connected to the communication system 100 and each of the plural vehicles 5 includes the information providing apparatus 2. Users of the plural vehicles 5 can use a function of the communication system 100 via the information providing apparatus 2.

The information providing apparatus 2 is mounted on the vehicle 5 and provides information to the user (mainly driver) of the vehicle 5. The information providing apparatus 2 receives and sends signals, via an in-vehicle network 58, from/to a function providing apparatus 50 provided to the vehicle 5. The function providing apparatus 50 provides a vehicle function effective to reduce load of the user of the vehicle 5 and/or improve convenience. The function providing apparatus 50 includes apparatuses to provide vehicle functions, for example, listed below:

Adaptive cruise control (ACC)
Lane keeping assist system (LKA)
Traffic sign recognition (TSR)
Lane departure warning (LDW)
Blind spot detection (BSD)
Forward collision warning (FCW)
Hill-start assist control (HAC)
Multi angle vision (MAV)
Snow mode
Night vision Normally, one vehicle 5 does not include the apparatuses to provide all the vehicle functions listed above but selectively includes the apparatuses to provide some of the foregoing vehicle functions, as the function providing apparatus 50. Therefore, types of the function providing apparatus 50 included in the vehicle 5 differ, depending on the vehicle 5. Moreover, the foregoing vehicle functions are only examples and the vehicle 5 may include the function providing apparatus 50 other than the foregoing vehicle functions.

The information providing apparatus 2 determines, based on a traveling environment of the vehicle 5, whether or not use of the vehicle function is suitable. The information providing apparatus 2 acquires, from the server 1 via the network 9, determination conditions that are used to determine suitability of the use of the vehicle function. Then, in a case where the traveling environment satisfies the determination conditions, the information providing apparatus 2 determines that the use of the vehicle function is suitable and provides, to the user of the vehicle, a message suggesting the use of the vehicle function. A configuration and a process of the communication system 100 will be described below.

1-2. Configuration of Information Providing Apparatus

Figure 2:
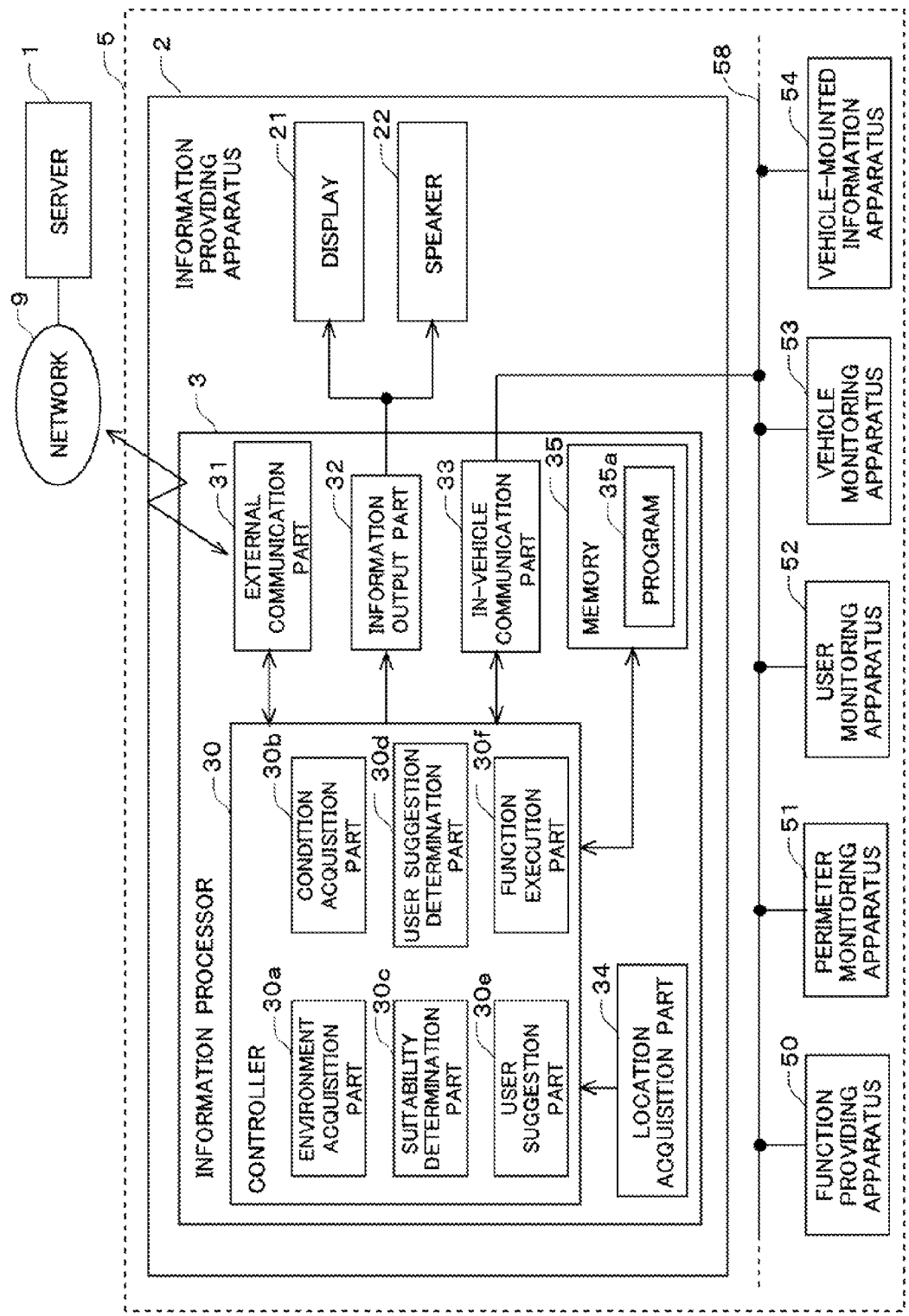
FIG. 2 mainly illustrates a configuration of an information providing apparatus in a first embodiment.

FIG. 2 illustrates a configuration of the information providing apparatus 2 and also illustrates a configuration relating to the information providing apparatus 2. The information providing apparatus 2 includes mainly a display 21, a speaker 22 and an information processor 3.

The display 21 is a display apparatus that displays information provided to the user of the vehicle 5. The display 21 is provided in an appropriate position in a cabin of the vehicle 5 such that the user can see a screen of the display 21. The display 21 includes a touch panel function and serves as an operation portion that receives an operation of the user. Moreover, the speaker 22 is provided in an appropriate position in the cabin of the vehicle 5 and outputs various sound to the cabin of the vehicle 5.

The information processor 3 processes various information and controls the display 21 and the speaker 22 to output information to be provided to the user. The information processor 3 includes an external communication part 31, an information output part 32, an in-vehicle communication part 33, a location acquisition part 34, a memory 35 and a controller 30.

The external communication part 31 includes a communication function that uses a wireless communication protocol, such as LTE and WiMAX, and communicates via the network 9. The information providing apparatus 2 receives and sends signals from/to the server 1 via the external communication part 31. It is recommended that the external communication part 31 should receive and send signals from/to another communication apparatus connected to the network 9, in addition to the server 1.

The information output part 32 sends an image signal to the display 21 to cause the display 21 to display an image relating to the information to be provided to the user. Moreover, the information output part 32 sends an audio signal to the speaker 22 to cause the speaker 22 to output sound relating to the information to be provided to the user.

The in-vehicle communication part 33 is connected to the in-vehicle network 58, such as a CAN, and communicates with other electronic apparatuses provided in the vehicle 5. Besides the function providing apparatus 50, a perimeter monitoring apparatus 51, a user monitoring apparatus 52, a vehicle monitoring apparatus 53, a vehicle-mounted information apparatus 54, etc. are among the electronic apparatuses. The in-vehicle communication part 33 receives signals from the electronic apparatuses 50 to 54 via the in-vehicle network 58 and also sends signals to those electronic apparatuses 50 to 54. The vehicle 5 may include the electronic apparatuses 51 to 54 partially.

The perimeter monitoring apparatus 51 acquires information about an object (including a person and another vehicle) in an area around the vehicle 5 by monitoring the area around the vehicle 5. The perimeter monitoring apparatus 51 includes a radar system that detects a location of the object in a front direction and in a rear direction of the vehicle 5, a vehicle-mounted camera that captures an image of an area around the vehicle 5, and a sound navigation and ranging (sonar) that detects an object in a vicinity of the vehicle 5, etc.

The user monitoring apparatus 52 acquires information about the user by monitoring the user of the vehicle 5. The user monitoring apparatus 52 includes a reading apparatus that reads information of a mobile apparatus carried by the user, an in-vehicle camera that captures an image of the user, a biological sensor that detects biological information of the user, etc. The biological sensor is provided to, for example, a steering wheel or another portion that the user directly touches.

The vehicle monitoring apparatus 53 acquires information about the vehicle 5 by monitoring the vehicle 5. The vehicle monitoring apparatus 53 includes a vehicle speed sensor that acquires a speed of the vehicle 5, an acceleration sensor that detects an acceleration of the vehicle 5, etc.

The vehicle-mounted information apparatus 54 provides various contents to the user of the vehicle 5. The vehicle-mounted information apparatus 54 includes a playing apparatus that reproduces images and sounds based on a memory and/or data, a car navigation apparatus that provides a route guidance leading to a destination to the user of the vehicle 5, etc.

Moreover, the location acquisition part 34 of the information processor 3 acquires a current location showing a location where the vehicle 5 is currently located. The location acquisition part 34 includes a GPS that acquires a latitude and an altitude of the current location of the vehicle 5, for example, by receiving signals from plural satellites.

The memory 35 stores various information necessary for the information providing apparatus 2. The memory 35 is, for example, a non-volatile storing device, such as a flash memory. The memory 35 stores a program 35a serving as a firmware. The program 35a is acquired, by reading, from a storage device, such as a memory card, and is stored in the memory 35 beforehand. The program 35a may be acquired by another method, such as download from a communication apparatus connected to the network 9.

The controller 30 is a microcomputer including a CPU, a RAM, a ROM, etc., and controls the entire information providing apparatus 2. The CPU of the controller 30 executes the program 35a stored in the memory 35 (the CPU performs an arithmetic process based on the program 35a) and thus various functions necessary for the controller 30 are implemented.

An environment acquisition part 30a, a condition acquisition part 30b, a suitability determination part 30c, a user suggestion determination part 30d, a user suggestion part 30e and a function execution part 30f, shown in FIG. 2, are among the functions of the controller 30 implemented by the execution of the program 35a.

The environment acquisition part 30a acquires traveling environment information indicating the traveling environment of the vehicle 5. The traveling environment information of the vehicle 5 is information showing situations of a road and a vicinity that the vehicle 5 is traveling and the information includes, for example, a date, a type of the road, traffic congestion, weather, etc. The environment acquisition part 30a acquires the traveling environment information of the vehicle 5 from the server 1 via the network 9.

The condition acquisition part 30b acquires the determination conditions that are used to determine whether or not the use of the vehicle function included in the vehicle 5 is suitable. The condition acquisition part 30b acquires the determination conditions from the server 1 via the network 9. In a case where the vehicle 5 includes plural vehicle functions that are different from each another, for example, ACC, LKA and snow mode, the condition acquisition part 30b acquires the determination conditions for each of the plural vehicle functions.

The suitability determination part 30c determines whether or not the use of each vehicle function included in the vehicle 5 is suitable. The suitability determination part 30c determines, based on whether or not the traveling environment of the vehicle 5 indicated by the traveling environment information acquired by the environment acquisition part 30a satisfies the determination conditions acquired by the condition acquisition part 30b, whether or not the use of the vehicle function is suitable. In a case where the vehicle 5 includes plural vehicle functions that are different from each another, such as ACC, LKA and snow mode, the suitability determination part 30c determines whether or not the use of each of the plural vehicle functions is suitable.

In a case where the suitability determination part 30c determines that the use of the vehicle function is suitable, the user suggestion determination part 30d determines whether or not to provide the message suggesting the use of the vehicle function to the user. The user suggestion determination part 30d determines, based on a past used state of the vehicle function by the user, whether or not it is necessary to provide the message suggesting the use of the vehicle function to the user. The user suggestion determination part 30d acquires the past used state by the user from the server 1 via the network 9.

In a case where the user suggestion determination part 30d determines that it is necessary to provide the message suggesting the use of the vehicle function to the user, the user suggestion part 30e provides the message suggesting the use of the vehicle function to the user, using the display 21 and the like. In response to the message, the user approves or disapproves the use of the vehicle function.

In a case where the user approves the use of the vehicle function in response to the message provided by the user suggestion part 30e, the function execution part 301 activates the vehicle function. The function execution part 30f activates the vehicle function by sending a signal to the function providing apparatus 50 that provides the vehicle function via the in-vehicle communication part 33.

As described above, the user can activate the vehicle function by approving the message provided by the user suggestion part 30e. Moreover, in addition to the approval of the suggestion as described above, the user can activate a desired vehicle function at a desired timing, by a regular operation with the operation portion without a suggestion.

In a case where the vehicle function is activated by the approval of the suggestion or by the operation with the operation portion by the user, the controller 30 sends used state data indicative of the use of the vehicle function, to the server 1 via the network 9. Such used state data includes the location (current location) and the traveling environment (date, type of the road, traffic congestion, weather, etc.) in which the user has determined to use the vehicle function (when the user has approved the suggestion or when the user has made an operation with the operation portion).

Moreover, in a case where the user disapproves the suggestion and does not use the vehicle function, the controller 30 also sends used state data indicative of disapproval of the suggestion of use of the vehicle function, to the server 1 via the network 9. Such used state data includes the location and the traveling environment in which the user has disapproved the suggestion.

The information providing apparatuses 2 of the plural vehicles 5 connected to the communication system 100 individually send such used state data to the server 1, on an as-needed basis. Therefore, the used state data of the users of the plural vehicles 5 connected to the communication system 100 are accumulated in the server 1.

1-3. Configuration of Server

Figure 3:
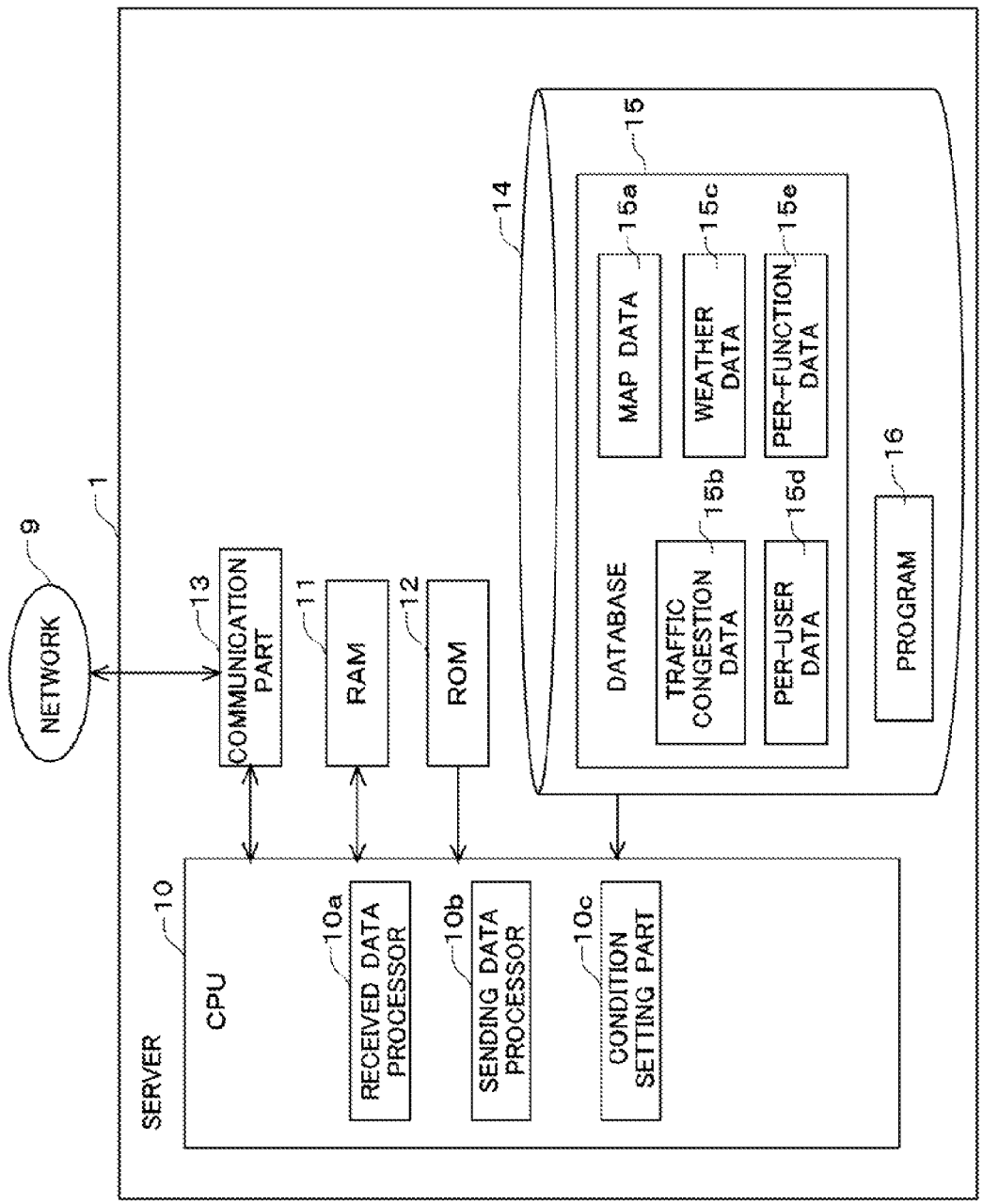
FIG. 3 mainly illustrates a configuration of a server.

Next, a configuration of the server 1 will be described below. FIG. 3 illustrates the configuration of the server 1. The server 1 is a computer including a CPU 10, a RAM 0.11 and a ROM 12. Moreover, the server 1 includes a communication part 13 that communicates via the network 9 and also includes a hard disk 14, a non-volatile memory device. The server 1 sends and receives the signals to/from the information providing apparatus 2 mounted on the vehicle 5, via the communication part 13.

The hard disk 14 stores a program 16. Functions necessary for the server 1 are implemented by the CPU 10 executing the program 16 (the CPU 10 performs an arithmetic process based on the program 16). A received data processor 10a, a sending data processor 10b and a condition setting part 10c, shown in FIG. 3, are among the functions implemented by the execution of the program 16.

The received data processor 10a processes data, such as the used state data, received from the information providing apparatus 2 of the vehicle 5. The sending data processor 10b processes data to be sent to the information providing apparatus 2 of the vehicle 5. Moreover, the condition setting part 10c sets the determination conditions that are used to determine whether or not the use of the vehicle function included in the vehicle 5 is suitable.

Moreover, the hard disk 14 stores a database 15. The database 15 includes map data 15a, traffic congestion data 15b, weather data 15c, per-user data (data per user) 15d and per-function data (data per function) 15e.

The map data 15a includes information relating to map of a region through which the vehicle 5 connected to the communication system 100 will possibly travel. The map data 15a includes, for example, types of roads (highway and local street).

The traffic congestion data 15b includes information relating to traffic congestion in the region through which the vehicle 5 connected to the communication system 100 will possibly travel. The traffic congestion data 15b includes current presence or absence of traffic congestion (whether or not there is traffic congestion) associated with a location of the traffic congestion.

The weather data 15c includes weather information of the region through which the vehicle 5 connected to the communication system 100 will possibly travel. The weather data 15c includes, for example, the current weather (sunny, rainy, cloudy, snowy, etc.) associated with a location of the weather.

The per-user data 15d and the per-function data 15e are categorized and accumulated used state data received from the information providing apparatuses 2 of the plural vehicles 5 connected to the communication system 100. The per-user data 15d is the used state data categorized according to user that uses the communication system 100. The per-user data 15d is registered in association with user identification information. The per-function data 15e is the used state data categorized according to vehicle function that is used by the communication system 100. The per-function data 15e is registered in association with vehicle function identification information.

Figure 4:
FIG. 4 illustrates an example of per-user data.

FIG. 4 illustrates an example of the per-user data 15d of one user. The per-user data 15d is table data that includes plural records Ra. Each of the plural records Ra corresponds to one vehicle function and a latest user response to the vehicle function is registered. The per-user data 15d is indicative of the past used state by the user relating to the vehicle functions.

In each of the plural records Ra, a "vehicle function name" for identifying the vehicle function is associated with "time and date" of the latest user response to the vehicle function and with a "user response" indicative of a concrete content of the latest user response.

In a case where the user approves the suggestion of the use of the vehicle function or where the user uses the vehicle function by the operation with the operation portion, "used" is registered in the "user response" of the record Ra of the vehicle function. On the other hand, in a case where the user disapproves the suggestion and does not use the vehicle function, "disapproval" is registered in the "user response" of the record Ra corresponding to the vehicle function. Moreover, in a case where the user has never used the vehicle function before and where the message suggesting the use of the vehicle function has never been provided to the user before, cells for the "time and date" and the "user response" of the record Ra corresponding to the vehicle function are left blank (null).

Moreover, FIG. 5 illustrates an example of the per-function data 15e of one vehicle function. The per-function data 15e is table data that includes plural records Rb. Each of the plural records Rb is indicative of the used state of the vehicle function per use. In other words, once any one of the users of the plural vehicles 5 connected to the communication system 100 uses the vehicle function, one record Rb is added to the table data. The per-function data 15e is indicative of the used state relating to the vehicle function used by the users of the plural vehicles 5.

In each of the plural records Rb, a "user ID" for identifying the user that has used the vehicle function, is associated with a "location" and a "traveling environment" ("time and date," "type of road," "presence or absence of traffic congestion," "weather," etc.) in which the user has used the vehicle function.

Once receiving the used state data from the information providing apparatus 2 of the vehicle 5, the received data processor 10a updates the contents of the per-user data 15d and the per-function data 15e of the database 15 to include a content of the received used state data.

1-4. Process of Communication System

Figure 6:
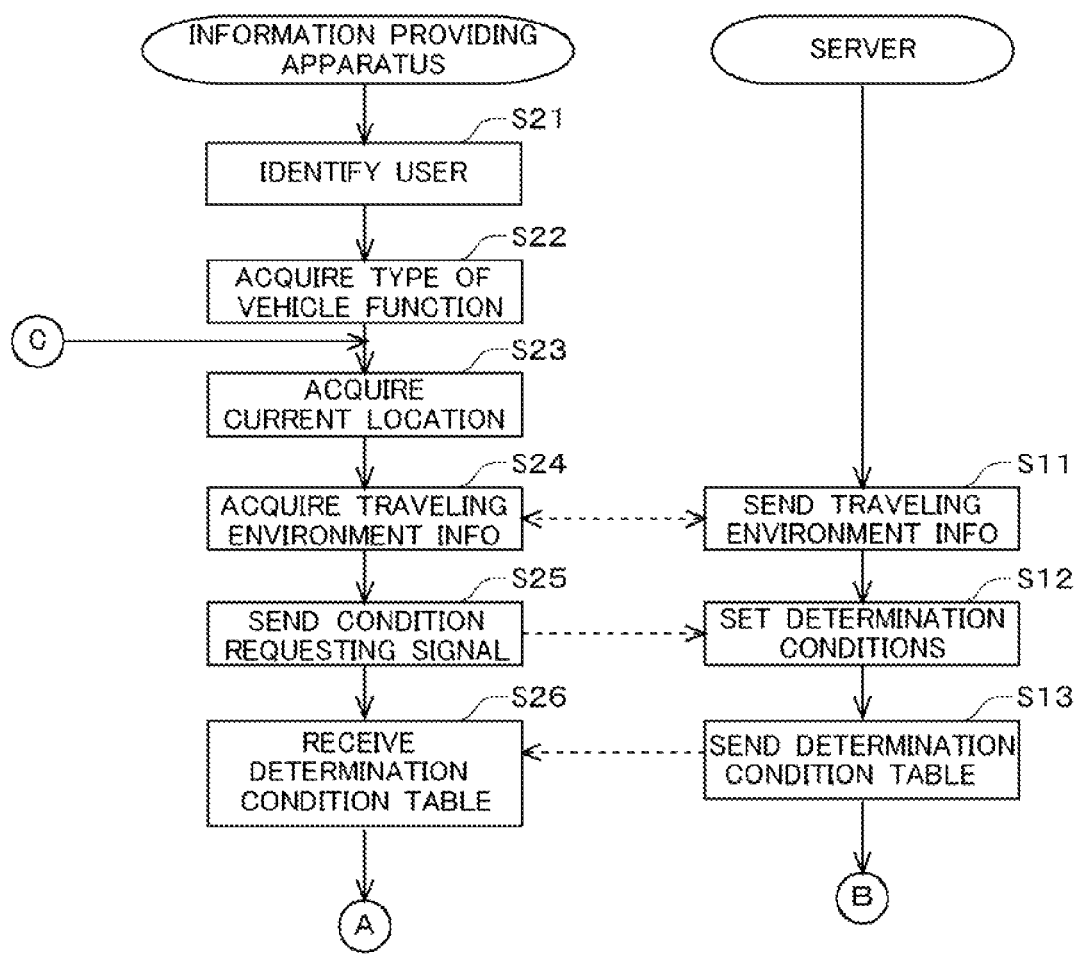
FIG. 6 illustrates a flow of a process performed by the communication system in the first embodiment.
Figure 7:
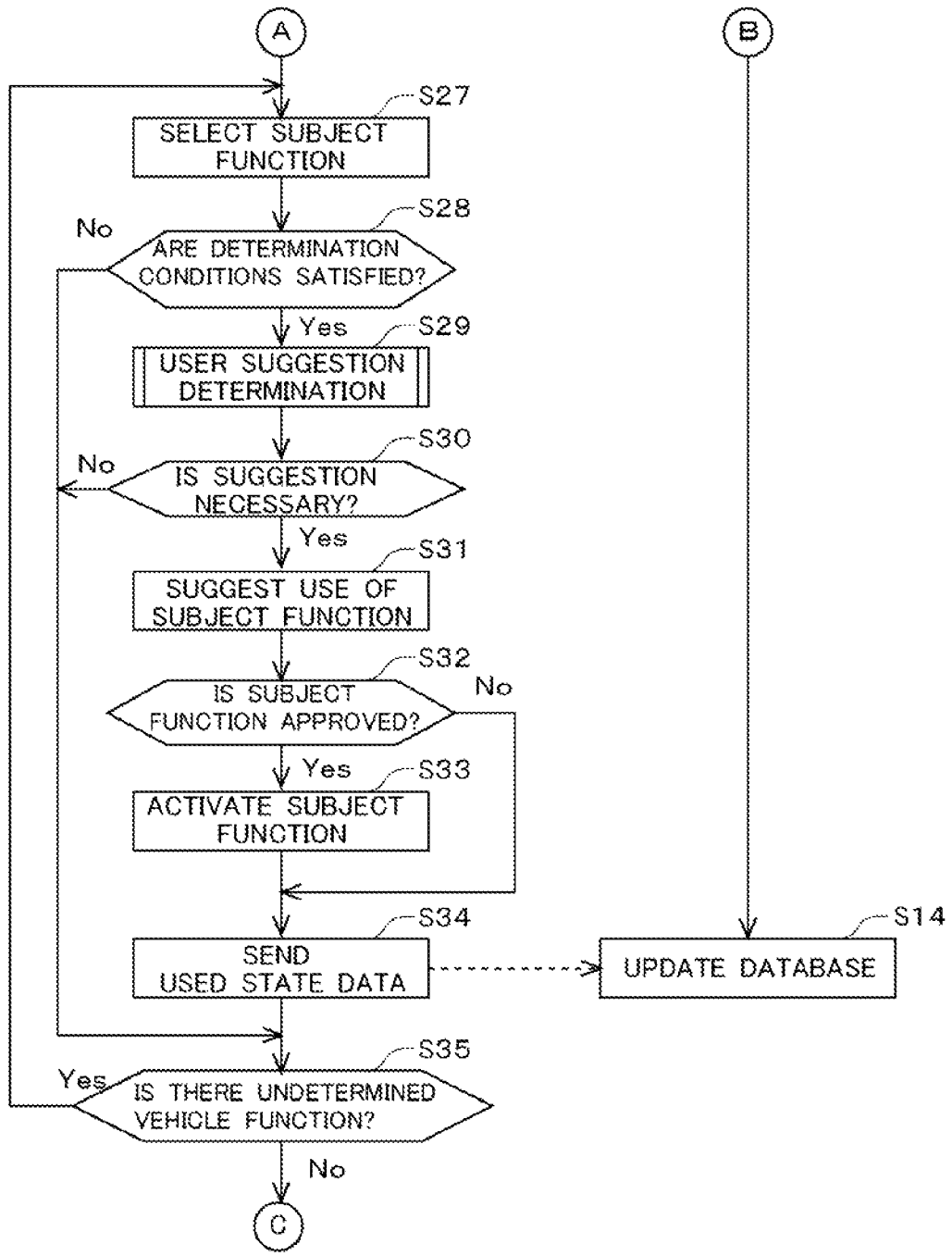
FIG. 7 illustrates the flow of the process performed by the communication system in the first embodiment.

Next, the process performed by the communication system 100 will be described. FIG. 6 and FIG. 7 illustrate a flow of the process performed by the communication system 100. The flow of the process performed by the communication system 100 will be described below, with a focus on one vehicle 5. The one vehicle 5 used for the explanation below is referred to as "subject vehicle" and a user of the subject vehicle is referred to as "subject user."

Once the information providing apparatus 2 of the subject vehicle is activated, first the controller 30 identifies the subject user and acquires the identification information of the subject user (a step S21). The controller 30 identifies the subject user based on information relating to the subject user that is acquired by the user monitoring apparatus 52. The controller 30 identifies the subject user based on, for example, information of the mobile apparatus that the subject user carries, an image of the subject user, biological information of the subject user and the like.

Next, the controller 30 acquires types of the vehicle functions included in the subject vehicle (a step S22). The controller 30 sends a signal to the function providing apparatus 50 via the in-vehicle communication part 33 to understand the types of the vehicle functions included in the subject vehicle. Generally, one vehicle 5 includes plural vehicle functions, such as ACC, LKA and snow mode. The explanation below describes a case where the subject vehicle includes plural vehicle functions that are different from each another.

Next, the location acquisition part 34 acquires a current location of the subject vehicle based on signals from the plural satellites (a step S23).

Next, the environment acquisition part 30a acquires the traveling environment information indicating the traveling environment of the current location of the subject vehicle (a step S24). The environment acquisition part 30a sends to the server 1 an environment requesting signal for requesting the traveling environment information. The environment requesting signal includes the current location of the subject vehicle acquired by the location acquisition part 34.

In response to the environment requesting signal, the sending data processor 10b of the server 1 sends the traveling environment information to the information providing apparatus 2 (a step S11). By reference to the map data 15a, the traffic congestion data 15b, the weather data 15c, etc. in the database 15, the sending data processor 10b acquires the traveling environment information indicating the traveling environment of the current location of the subject vehicle, such as the type of the road, presence/absence of traffic congestion and weather, and sends the traveling environment information to the information providing apparatus 2 via the network 9. Thus, the environment acquisition part 30a acquires the traveling environment information indicating the traveling environment of the current location of the subject vehicle from the server 1 via the network 9. Moreover, the environment acquisition part 30a acquires a present time and a present date as a part of the traveling environment information, using a clock function of the server 1 or the controller 30.

As described above, even if the vehicle 5 does not include an apparatus that detects the traveling environment, the environment acquisition part 30a acquires the traveling environment information indicating the traveling environment from the server 1 via the network 9.

Next, the condition acquisition part 30b acquires, from the server 1, the determination conditions that are used to determine whether or not the use of the vehicle function included in the subject vehicle is suitable. The condition acquisition part 30b first sends to the server 1 a condition requesting signal for requesting the determination conditions (a step S25). The condition requesting signal includes the current location of the subject vehicle and the identification information of each of the plural vehicle functions included in the subject vehicle.

In response to the condition requesting signal, the condition setting part 10c of the server 1 sets the determination conditions for each of the plural vehicle functions included in the subject vehicle (a step S12). The condition setting part 10c selects the per-function data 15e relating to each of the plural vehicle functions included in the subject vehicle, from amongst the per-function data 15e in the database 15. By reference to the per-function data 15e, the condition setting part 10c statistically understands the traveling environment in which the users of the plural vehicles 5 have actually used the vehicle function of the communication system 100 in a vicinity (e.g. within a radius of 1 km) of the current location of the subject vehicle. In other words, the condition setting part 10c statistically understands the traveling environment in which plural users (many and unspecified users) of the vehicles other than the subject vehicle have actually used the vehicle function in the vicinity of the current location of the subject vehicle. Then the condition setting part 10c sets the determination conditions based on the understood traveling environment.

For example, in a case where 80% or more users use the vehicle function on a highway, that is a type of road, in an absence of traffic congestion, the condition setting part 10e sets determination conditions that the "type of road" is "highway" and that "traffic congestion" is "absence." The "time and date" in the per-function data 15e is categorized into time periods, such as early morning, morning, daytime, evening, night and middle of night. Then, in a case where there is a tendency among the users of the plural vehicles 5 to use the vehicle function in a specific time period, the "time period" is set as another determination condition.

Figure 8:
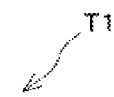
FIG. 8 illustrates an example of a determination condition table in the first embodiment.

The condition setting part 10e sets such determination conditions for each of the plural vehicle functions. Thus, the condition setting part 10c generates a determination condition table T1 as shown in FIG. 8. The determination condition table T1 includes the plural determination conditions corresponding to the plural vehicle functions included in the subject vehicle. The determination condition table T1 is a table data including plural records Rc. Each of the plural records Re corresponds to each vehicle function and represents the determination conditions set for the corresponding vehicle function.

In each of the plural records Rc, a "vehicle function name" for identifying the vehicle function is associated with the traveling environment ("time and date," "type of road," "presence or absence of traffic congestion," "weather," etc.) serving as the determination conditions that are used to determine whether or not the use of the vehicle function is suitable. In an example shown in FIG. 8, the determination conditions for ACC are: the "type of road" is "highway" and "presence or absence of traffic congestion" is "absence."

As described above, the condition setting part 10c sets the determination conditions based on actually used states by the users of the plural vehicles 5 in the vicinity of the current location of the subject vehicle. Therefore, appropriate determination conditions can be set flexibly based on past determination results determined by the plural users (determination results determined by people) in the vicinity of the current location of the subject vehicle.

Since the determination conditions are set, according to the current location of the subject vehicle, if the current location of the subject vehicle changes, the condition setting part 10c may change the determination conditions. For example, if the current location of the subject vehicle is changed, it is possible that the determination conditions for ACC are changed to determination conditions that the "type of road" is "local street" and "presence or absence of traffic congestion" is "absence."

Once generating the determination condition table T1 as described above, the condition setting part 10c sends the determination condition table T1 to the information providing apparatus 2 via the network 9 (a step S13). Thus, the condition acquisition part 30b acquires, from the server 1 via the network 9, the determination condition table T1 including the determination conditions for each of the plural vehicle functions included in the subject vehicle (a step S26).

Then, the suitability determination part 30c determines whether or not the use of each of the plural vehicle functions included in the subject vehicle is suitable, based on the traveling environment of the subject vehicle indicated by the traveling environment information acquired by the environment acquisition part 30a and on the determination condition table T1 acquired by the condition setting part 10c.

First, the suitability determination part 30e selects one of the plural vehicle functions included in the subject vehicle, as a "subject function" of which suitability of use is determined (a step S27 in FIG. 7).

Next, the suitability determination part 30c determines whether or not the traveling environment of the subject vehicle satisfies the determination conditions for the subject function in the determination condition table T1 (a step S28). For example, in a case where the subject function is ACC and where the determination condition table T1 is a determination condition table shown in FIG. 8, the suitability determination part 30c determines whether or not the traveling environment of the subject vehicle satisfies the determination conditions that the "type of road" is "highway" and that the "presence or absence of traffic congestion" is "absence."

In a case where the traveling environment of the subject vehicle does not satisfy the determination conditions for the subject function (No in the step S28), the suitability determination part 30c determines that the use of the subject function is not suitable and the process moves to a step S35.

On the other hand, in a case where the traveling environment of the subject vehicle satisfies the determination conditions for the subject function (Yes in the step S28), the suitability determination part 30c determines that the use of the subject function is suitable. In this case, subsequently the user suggestion determination part 30d executes a user suggestion determination process (a step S29) to determine whether or not to provide the message suggesting the use of the subject function to the subject user.

Even if the message suggesting the use of the subject function is uniformly provided to users in a situation where the use of the vehicle function is determined as suitable, some users are uncomfortable with the provided message. On the other hand, some users like to be provided actively with the message suggesting the use of the vehicle function because those users do not know or forget an operation method of the vehicle function. Therefore, the user suggestion determination part 30d determines, in the user suggestion determination process (the step S29), whether or not to provide the message suggesting the use of the subject function to the subject user, based on the past used state of the subject function by the subject user, so as to meet needs of the subject user.

Figure 9:
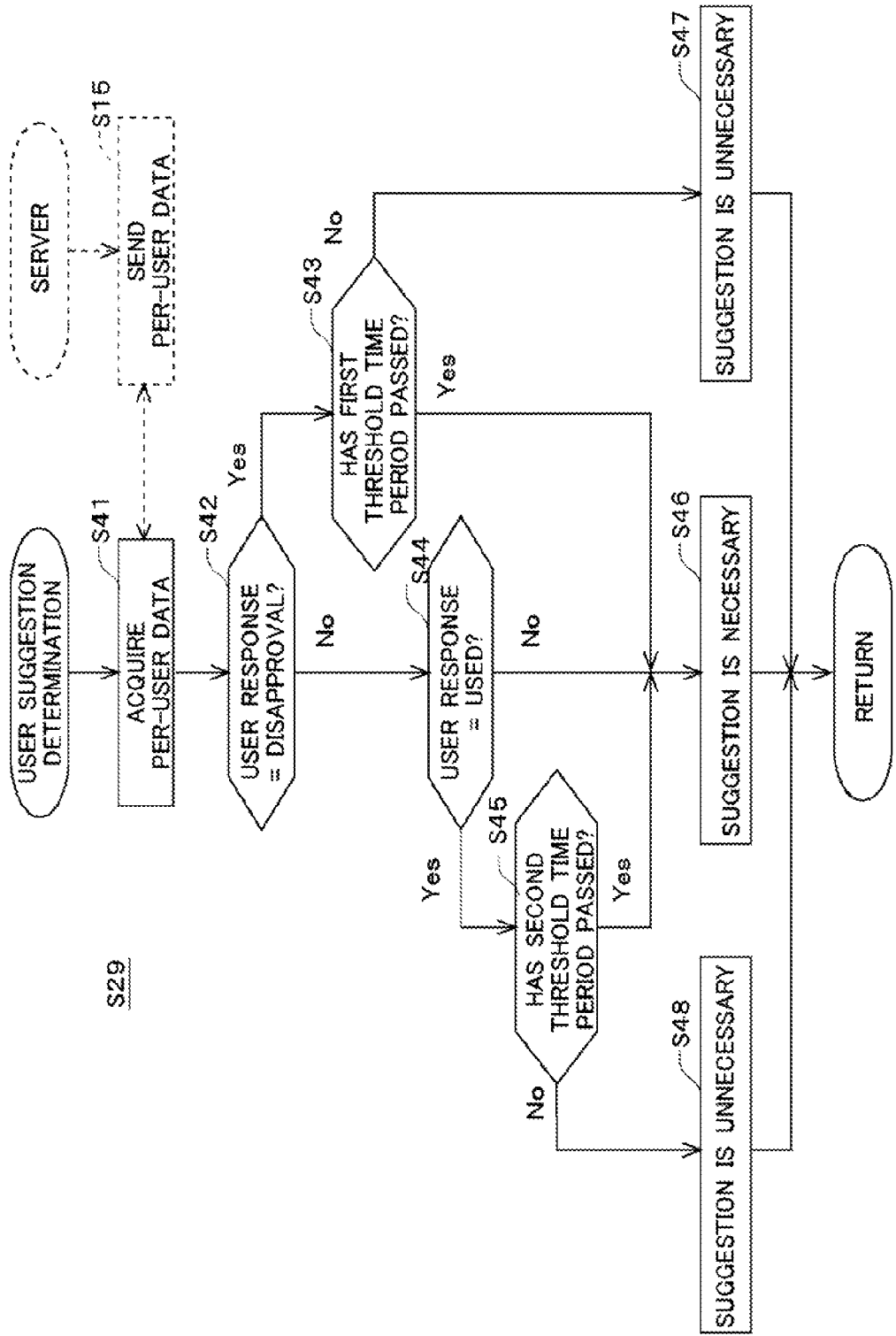
FIG. 9 illustrates a detailed flow of the user suggestion determination process.

FIG. 9 illustrates a detailed flow of the user suggestion determination process (the step S29).

First, the user suggestion determination part 30d acquires, from the server 1, the per-user data 15d indicative of the past used state of the subject function by the subject user (a step S41). The condition acquisition part 30b sends to the server 1 a data requesting signal for requesting the per-user data 15d. The data requesting signal includes the identification information of the subject user acquired in the step S21 in FIG. 6.

In response to the data requesting signal, the sending data processor 10b of the server 1 sends the per-user data 15d of the subject user to the information providing apparatus 2 via the network 9 (a step S15). Thus, the user suggestion determination part 30d acquires the per-user data 15d from the server 1 via the network 9.

Next, by reference to the "user response" of the record Ra corresponding to the subject function in the per-user data 15d (refer to FIG. 4), the user suggestion determination part 30d determines whether or not a latest subject, user response to a suggestion of the use of the subject function is "disapproval" (a step S42).

In a case where the latest subject user response to the suggestion of the use of the subject function is "disapproval" (Yes in the step S42), it is deemed that the subject user does not desire the use of the subject function. Therefore, in principle, the user suggestion determination part 30d determines that the message suggesting the use of the subject function is "unnecessary" (a step S47).

However, in a case where a relatively long time period has passed since the latest subject user response (e.g. 6 months), the user may change the mind and possibly desires the use of the subject function. Therefore, in the case where a first threshold time period (e.g. 6 months) has passed since the latest subject user response (Yes in a step S43), the user suggestion determination part 30d determines that the message suggesting the use of the subject function is "necessary" (a step S46).

Moreover, in a case where the latest subject user response to the suggestion of the use of the subject function is not "disapproval" (No in the step S42), the user suggestion determination part 30d next determines whether or not the latest subject user response to the subject function is "used" (a step S44).

In a case where the latest subject user response to the subject function is "used" (Yes in the step S44), since the subject user has used the subject function before, it is considered that the subject user uses the subject function voluntarily by performing an operation with the operation portion. Therefore, in principle, the user suggestion determination part 30d determines that the message suggesting the use of the subject function is "unnecessary" (a step S48).

However, in a case where some time has passed since the latest subject user response (e.g. one month), there is a possibility that the user may forget the operation method of the subject function. Therefore, in the case where a second threshold time period (e.g. one month) has passed since the latest subject user response (Yes in a step S45), the user suggestion determination part 30d determines that the message suggesting the use of the subject function is "necessary" (a step S46).

Further, in a case where the latest subject user response to the subject function is not "disapproval" or "used" (No in the step S44), it is considered that the subject user has no experience in using the subject function. In this case, the user suggestion determination part 30d determines that the message suggesting the use of the subject function is "necessary" to provide an opportunity to the subject user of experiencing convenience of the subject function (the step S46).

As described above, the user suggestion determination part 30d determines, based on the past used state of the subject function by the subject user, whether or not to provide the message suggesting the use of the subject function to the subject user. Therefore, it is possible to appropriately determine whether or not to provide the message suggesting the use of the subject function to the subject user so as to meet the needs of the subject user.

With reference back to FIG. 7, once the user suggestion determination process (the step S29) is completed, a process is performed based on a determination result made in the user suggestion determination process. In the case where it is determined that the message suggesting the use of the subject function is "unnecessary" (No in a step S30) in the user suggestion determination process, the message suggesting the use of the subject function is not provided and the process moves to the step S35.

Figure 10:
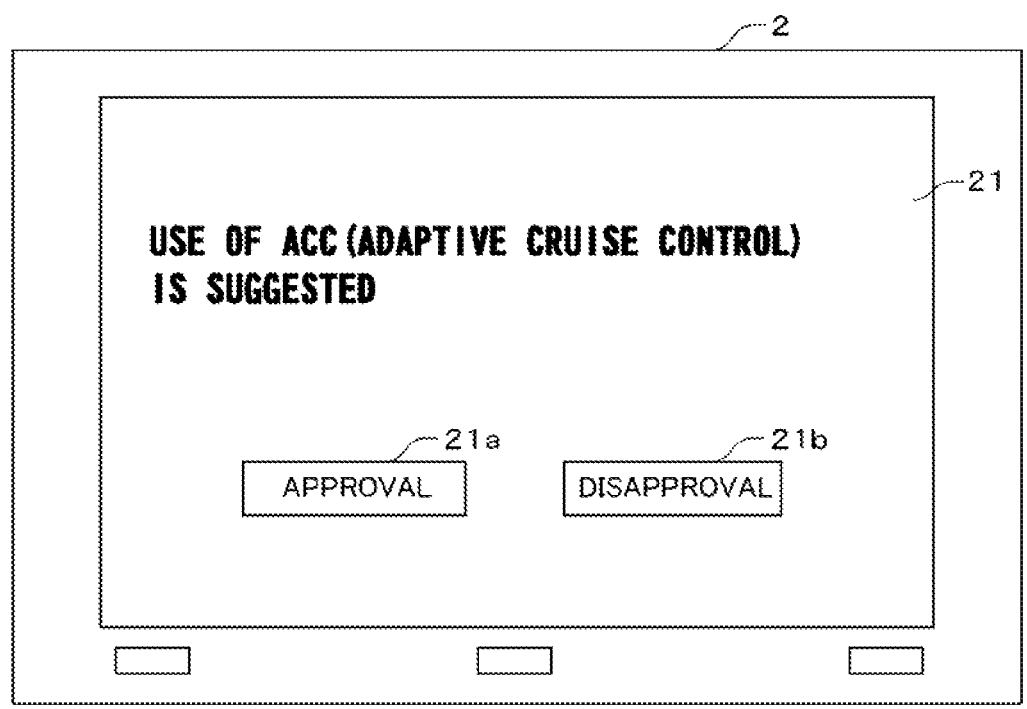
FIG. 10 illustrates an example of a message suggesting use of a vehicle function.

On the other hand, in the case where it is determined that the message suggesting the use of the subject function is "necessary" (Yes in the step S30) in the user suggestion determination process, the user suggestion part 30e provides the message suggesting the use of the subject function to the subject user (a step S31). In this case, the user suggestion part 30e controls the information output part 32 and causes a message suggesting the use of the subject function to be displayed on the screen of the display 21, as shown in FIG. 10. When the message is displayed, it is recommended that a predetermined sound should be output from the speaker 22 in line with the display of the message.

Moreover, an approval button 21a and a disapproval button 21b are further displayed on the screen of the display 21. By touching one of the two command buttons in response to the message suggesting the use of the subject function, the subject user approves or disapproves the use of the subject function.

In a case where the subject user approves the use of the subject function (Yes in a step S32), the function execution part 30I sends a predetermined signal to the function providing apparatus 50 that provides the subject function via the in-vehicle communication part 33, to activate the subject function (a step S33). Thus, the subject user can easily activate the subject function only by approving the use of the subject function in response to the message. Subsequently, the controller 30 sends, to the server 1 via the network 9, the used state data indicative of a use of the subject function (a step S34).

On the other hand, in a case where the subject user disapproves the use of the subject function (No in the step S32), the function execution part 30f does not activate the subject function and sends, to the server 1 via the network 9, the used state data indicative of the disapproval of the suggestion of the use of the subject function (the step S34).

The used state data sent as described above is received by the server 1. The received data processor 10a of the server 1 updates contents of the per-user data 15d and the per-function data 15e of the database 15 so as to include contents of the received used state data (a step S14).

Once the process of one vehicle function is completed, as described above, the suitability determination part 30c determines whether or not there is a vehicle function that has not been selected as the subject function, among the plural vehicle functions included in the subject vehicle (a step S35). In a case where there is an unselected vehicle function (Yes in the step S35), the process returns to the step S27 and one of the unselected vehicle functions is selected as a new vehicle function, and then it is determined, as described above, whether or not the use of the subject function is suitable. Such a process is repeated and it is determined whether or not use of every vehicle function included in the subject vehicle is suitable.

Once suitability of use of every vehicle function included in the subject vehicle is determined (No in the step S35), the process returns to the step S23 in FIG. 6, and the current location of the subject vehicle is newly acquired. Then, the process described above is repeated again.

As described above, the environment acquisition part 30a of the information providing apparatus 2 in this embodiment acquires the traveling environment information indicating the traveling environment of the vehicle 5 and the condition acquisition part 30b acquires, from the predetermined server 1 via the network 9, the determination conditions to determine whether or not the use of the vehicle function included in the vehicle 5 is suitable. Then, in a case where the traveling environment indicated by the acquired traveling environment information satisfies the determination conditions, the user suggestion part 30e provides the message suggesting the use of the vehicle function to the user. Since whether or not the use of the vehicle function is suitable is determined based on the determination conditions acquired from the server 1, the use of the vehicle function can be appropriately suggested.

Moreover, the location acquisition part 34 acquires the current location where the vehicle 5 is currently located and the environment acquisition part 30a acquires the traveling environment information indicating the traveling environment of the current location of the vehicle 5, and the condition acquisition part 30b acquires the determination conditions, according to the current location of the vehicle 5. Therefore, it is possible to determine, based on the current location of the vehicle 5, whether or not the use of the vehicle function is suitable and to suggest the use of the vehicle function more appropriately.

Moreover, the condition setting part 10c of the server 1 sets the determination conditions, according to the used state of the vehicle function by the users of the plural vehicles 5 connected to the communication system 100. Therefore, it is possible to flexibly set appropriate determination conditions including actual used states of the plural users of the vehicles. Then, since it is determined whether or not the use of the vehicle function is suitable based on the determination conditions including the actual used state, the use of the vehicle function can be suggested more appropriately.

Further, the user suggestion determination part 30d determines, based on the past used state of the vehicle function by the user, whether or not to provide the message suggesting the use of the vehicle function to the user. Thus, it is possible to suggest the use of the vehicle function appropriately so as to meet the needs of the user.

Further, the per-user data 15d indicative of the past used state of the vehicle function by the user is stored in the server 1 and the user suggestion determination part 30d acquires the per-user data 15d from the server 1 via the network 9. Thus, even in a case where the user changes vehicles 5, it is possible to suggest the use of the vehicle function to the user appropriately, based on the per-user data 15d corresponding to the user stored in the server 1.

2. Second Embodiment

Next, a second embodiment will be described. A configuration and functions of a communication system 100 in the second embodiment are substantially the same as the configuration and the functions of the communication system 100 in the first embodiment. Therefore, differences from the first embodiment will be mainly described.

In the first embodiment, in a case where the traveling environment satisfies the determination conditions of any of the plural vehicle functions, the user suggestion part 30e provides the message suggesting the use of the vehicle function corresponding to the determination conditions. Then, in response to the message, in a case where the user approves the use of the vehicle function, the function execution part 30f activates the vehicle function. However, in the second embodiment, in a case where the traveling environment satisfies any of the determination conditions of plural vehicle functions and where the vehicle function corresponding to the satisfied determination conditions is a predetermined vehicle function (hereinafter referred to simply as "predetermined function"), a function execution part 30f automatically activates the vehicle function even without the approval of the user.

Among the plural vehicle functions included in a vehicle 5, the predetermined function that is automatically activated is defined beforehand. For example, it is recommended to define, as the predetermined function, for example, MAV and other functions that display images and information. On the other hand, it is not recommended to define, as the predetermined function, for example, ACC and other functions that intervene in operations of the driver with an accelerator and a steering wheel. The user may select and set the predetermined function from amongst the plural vehicle functions included in the vehicle 5, according to preferences of the user.

In this embodiment, the predetermined function is determined from the plural vehicle functions included in the vehicle 5, based on the determination condition table that the condition acquisition part 30b acquires from the server 1.

FIG. 11 illustrates an example of a determination condition table T2 in the second embodiment. The determination condition table T2 in the second embodiment is also table data that includes plural records Re. Each of the plural records Re corresponds to one vehicle function and is indicative of determination conditions set for the corresponding vehicle function. In addition, each of the plural records Re includes an item "predetermined function" and "Yes" or "No" is registered for the item "predetermined function." The predetermined function is a vehicle function of which "Yes" is registered in the item "predetermined function" in the record Rc.

Figure 12:
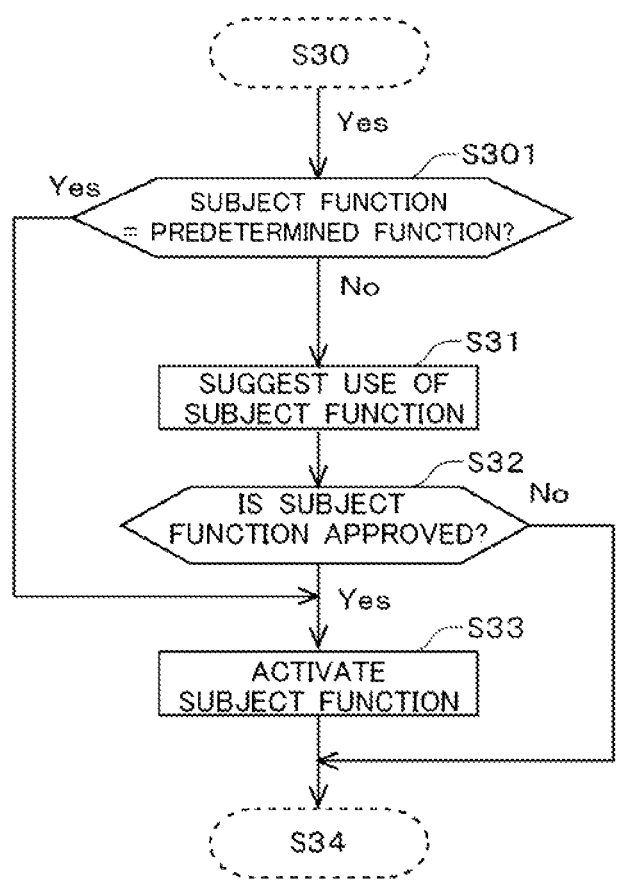
FIG. 12 illustrates a flow of a process performed by a communication system in the second embodiment.

A process performed by the communication system 100 in the second embodiment is different from the process in the first embodiment in terms of the steps after the message suggesting use of the subject function is determined as "necessary" (Yes in the step S30 in FIG. 7) in the user suggestion determination process. FIG. 12 illustrates a flow of the process performed by the communication system 100 in the second embodiment, mainly, the steps different from the process in the first embodiment.

In the case where a message suggesting use of a subject function is determined as "necessary" (Yes in the step S30) in the user suggestion determination process, a function execution part 30f determines whether or not the subject function is the predetermined function (a step S301). The subject function is a vehicle function associated with the determination conditions that the traveling environment satisfies. By reference to the determination condition table T2, the function execution part 30f determines whether or not the subject function is the predetermined function.

In a case where the subject function is not the predetermined function (No in the step S301), a user suggestion part 30e provides the message suggesting the use of the subject function to a subject user, like the step in the first embodiment (the step S31). In the case where the subject user approves the use of the subject function (Yes in the step S32), the function execution part 30f activates the subject function (the step S33).

On the other hand, in a case where the subject function is the predetermined function (Yes in the step S301), the message to be provided by the user suggestion part 30e to the subject user is skipped and the function execution part 30f automatically activates the subject function without first obtaining approval of the user (the step S33).

Figure 13:
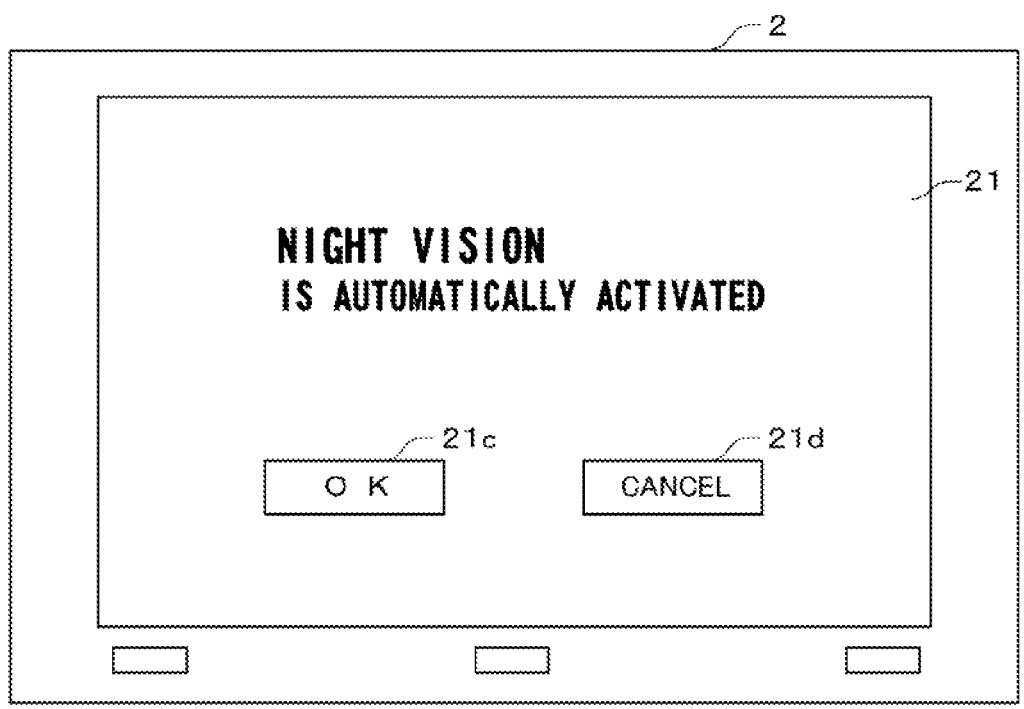
FIG. 13 illustrates an example of a message showing activation of a vehicle function.

As described above, in the case where the function execution part 30f automatically activates the subject function without the approval of the user, the function execution part 30f controls an information output part 32, as shown in FIG. 13, to display a message showing the automatic activation of the subject function on a screen of a display 21. When the message is displayed, it is recommended that a predetermined sound should be output from a speaker in line with display of the message.

Moreover, an OK button 21c and a cancel button 21d are further displayed on the screen of the display 21. The subject user can end the automatically activated subject function, by touching the cancel button 21d, one of the two command buttons.

As described above, in the second embodiment, in a case where it is determined that the use of the vehicle function is suitable and where the vehicle function is the predetermined function, the function execution part 30f automatically activates the vehicle function without first obtaining approval of the user. Thus, operation load of the user can be largely reduced.

3. Third Embodiment

Next, a third embodiment will be described. A configuration and functions of a communication system 100 in the third embodiment are substantially same as the configuration and the functions of the communication system 100 in the first embodiment. Therefore, differences from the first embodiment will be mainly described below.

In the first embodiment, whether or not the use of the vehicle function is suitable is determined, in terms of the current location of the vehicle 5. On the other hand, in the third embodiment, the communication system 100 derives a scheduled location that is a location through which a vehicle 5 will travel and determines suitability of the use of the vehicle function in the scheduled location.

Figure 14:
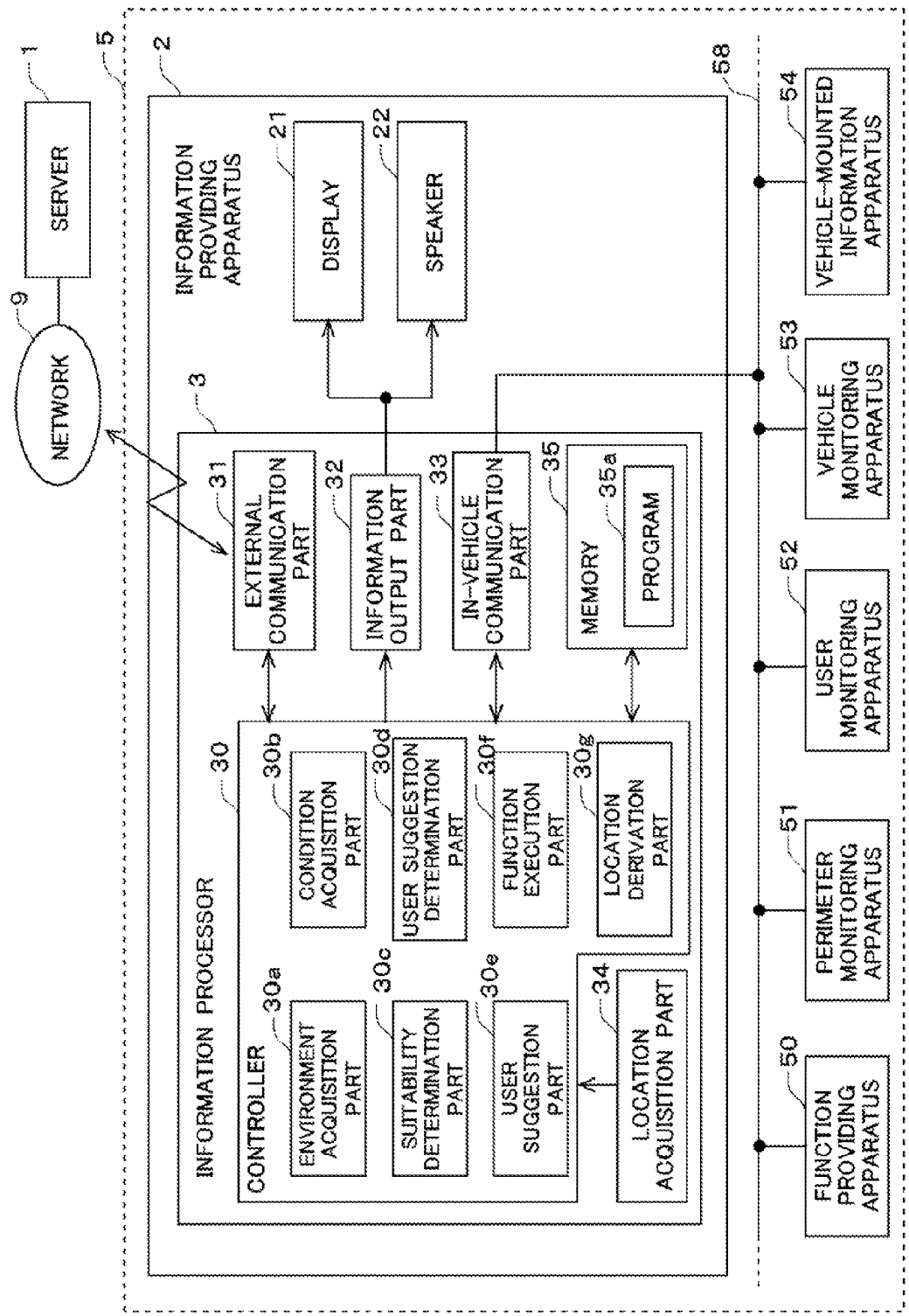
FIG. 14 mainly illustrates a configuration of an information providing apparatus in a third embodiment.

FIG. 14 illustrates a configuration of an information providing apparatus 2 in the third embodiment. The information providing apparatus 2 in the third embodiment includes a location derivation part 30g as a function of a controller 30. The location derivation part 30g is implemented by execution of a program 35a. The other configuration of the information providing apparatus 2 in the third embodiment is the same as the configuration in the first embodiment.

The location derivation part 30g derives the scheduled location that is a location through which the vehicle 5 will travel. The location derivation part 30g derives, as the scheduled location, a location through which the vehicle 5 will travel after a predetermined time period (e.g. 10 minutes), based on a current location of the vehicle 5, a route to a destination, and a speed of the vehicle 5.

A process performed by the communication system 100 in the third embodiment is partially different from the process performed by the communication system 100 in the first embodiment. The communication system 100 in the third embodiment uses the "scheduled location" of the vehicle 5, instead of the "current location" of the vehicle 5 in the first embodiment. Therefore, an environment acquisition part 30a acquires traveling environment information indicating a traveling environment of the scheduled location of the vehicle 5 and a condition acquisition part 30b acquires determination conditions, according to the scheduled location of the vehicle 5.

Figure 15:
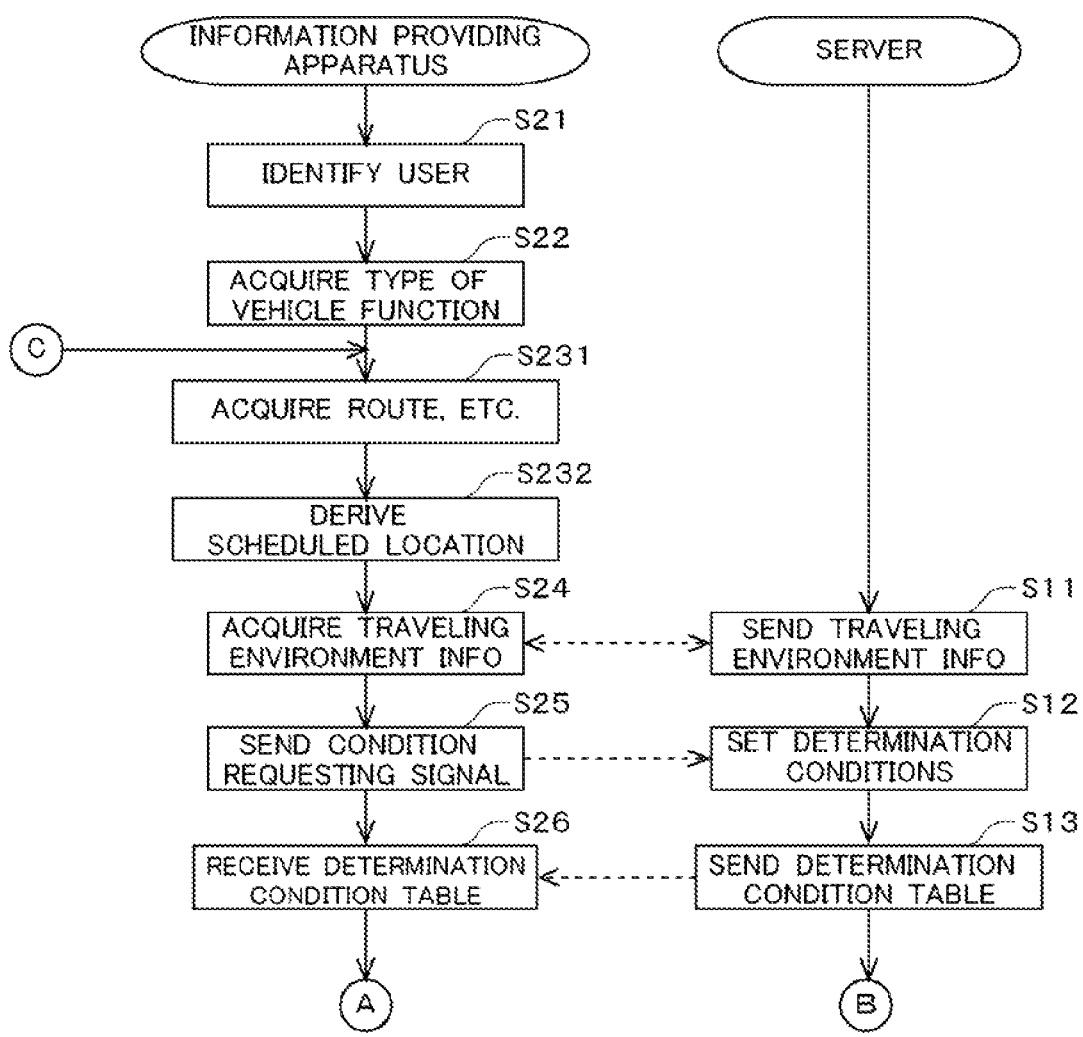
FIG. 15 illustrates a flow of a process performed by a communication system in the third embodiment.

FIG. 15 illustrates a flow of the process performed by the communication system 100 in the third embodiment, mainly steps different from the process performed in the first embodiment.

First, the controller 30 identifies a subject user (the step S21) and acquires types of the vehicle functions included in a subject vehicle (the step S22).

Next, the location derivation part 30g acquires the current location of the vehicle 5 from a location acquisition part 34, the route to the destination from a car navigation apparatus included in a vehicle-mounted information apparatus 54, and the speed of the vehicle 5 from a vehicle monitoring apparatus 53 (a step S231). Then, the location derivation part 30g derives the scheduled location of the vehicle 5, based on the current location of the vehicle 5, the route to the destination and the speed of the vehicle 5 (a step S232).

Next, the environment acquisition part 30a acquires the traveling environment information indicating the traveling environment of the scheduled location of the subject vehicle (the step S24). The environment acquisition part 30a sends to a server 1 an environment requesting signal including the scheduled location of the subject vehicle. Thus, the environment acquisition part 30a acquires the traveling environment information indicating the traveling environment of the scheduled location of the subject vehicle from the server 1 via the network 9. Moreover, the environment acquisition part 30a acquires a time and date derived by adding the predetermined time period (e.g. 10 minutes) to a current time and date, as a part of the traveling environment information.

Next, the condition acquisition part 30b acquires determination conditions for the scheduled location of the subject vehicle. The condition acquisition part 30b sends to the server 1 a condition requesting signal including the scheduled location of the subject vehicle (the step S25). In response to the condition requesting signal, a condition setting part 10c of the server 1 sets the determination conditions for each of the plural vehicle functions included in the subject vehicle (the step S12). The condition setting part 10c sets the determination conditions based on actual used states by the users of the plural vehicles 5 in a vicinity of the scheduled location of the subject vehicle.

The condition setting part 10c sends a determination condition table T1 to the information providing apparatus 2 via the network 9 (the step S13). Thus, the condition acquisition part 30b acquires, from the server 1 via the network 9, the determination condition table T1 including the determination conditions for each of the plural vehicle functions included in the subject vehicle (the step S26).

Subsequently, a suitability determination part 30c determines whether or not the use of each of the plural vehicle functions included in the subject vehicle is suitable, based on the traveling environment of the subject vehicle indicated by the traveling environment information acquired by the environment acquisition part 30a and on the determination condition table T1 acquired by the condition setting part 10c. Therefore, suitability of the use of the vehicle function can be determined based on the scheduled location of the vehicle 5.

As described above, in the third embodiment, it is possible to provide a message suggesting the use of the vehicle function beforehand based on the scheduled location of the vehicle, to determine whether or not the use of the vehicle function is suitable. For example, before a situation where the use of one vehicle function (e.g. ACC) is suitable, the message suggesting the use of the vehicle function can be provided to the user. Thus, the user can use the vehicle function immediately when the use of the vehicle function becomes suitable.

4. Other Embodiments

Other embodiments will be described below. Any form of the foregoing embodiments and described below may be arbitrarily combined with another.

4-1. Type of User

A condition setting part 10c may set determination conditions, according to a type of a user. The user can be categorized, for example, into types such as skilled driver and beginner driver. Such a type of the user can be set beforehand. A condition setting part 10c sets determination conditions, only using records Rb corresponding to a type same as the type of the subject user from per-function data 15e in the database 15. Thus, since whether or not the use of the vehicle function is suitable is determined based on the determination conditions according to the type of the user, it is possible to suggest the use of the vehicle function more appropriately.

4-2. Physical Condition of User

A condition setting part 10c may set determination conditions, according to a physical condition of a user. The physical condition of the user, such as sleepy and tired, changes from moment to moment. Such a change of the physical condition of the user can be acquired based on information of a biological sensor and the like. The condition setting part 10c sets the determination conditions, only using records Rb corresponding to a physical condition same as the physical condition of the subject user from per-function data 15e in the database 15. Thus, since whether or not the use of the vehicle function is suitable is determined based on the determination conditions according to the physical condition of the user, it is possible to suggest the use of the vehicle function more appropriately.

4-3. Purpose of Use of Vehicle

A condition setting part 10c may set determination conditions, according to a purpose of use of the vehicle 5. The user uses the vehicle 5 for leisure, business and other purposes. Such a purpose of use can be acquired based on information such as a route to a destination. The condition setting part 10c sets the determination conditions, only using records Rb corresponding a purpose same as the purpose intended by the subject user from per-function data 15e in the database 15. Thus, since whether or not the use of the vehicle function is suitable is determined based on the determination conditions according to the purpose of use of the vehicle 5, it is possible to suggest the use of the vehicle function more appropriately.

4-4. Other Modifications

In the foregoing embodiments, the information providing apparatus 2 is a vehicle-mounted apparatus that is mounted on the vehicle 5. However, a tablet device and a smartphone and another device carried by the user into the vehicle 5 may function as the information providing apparatus 2.

In the foregoing embodiments, the information providing apparatus 2 is different apparatus from the electronic apparatuses 51 to 54. However, the information providing apparatus 2 may be integrated into any of the electronic apparatuses 51 to 54. For example, the information providing apparatus 2 may be integrated with a car navigation apparatus that is a type of the vehicle-mounted information apparatus 54.

Moreover, in the foregoing embodiments, the environment acquisition part 30a acquires the traveling environment information indicating the traveling environment of the subject vehicle, mainly from the server 1. However, the environment acquisition part 30a acquires the traveling environment information partially or entirely from an apparatus, a device, etc. included in the subject vehicle. For example, in a case where the subject vehicle includes a car navigation apparatus, the environment acquisition part 30a acquires a type of a road of the current location or the scheduled location from the car navigation apparatus. Further, the environment acquisition part 30a may acquire the traveling environment information partially or entirely from a communication apparatus other than a predetermined server 1. For example, the environment acquisition part 30a can acquire weather of the current location or the scheduled location from the communication apparatus that provides weather information.

Further, the condition setting part 10c may change a content of the suggestion of the use of the vehicle function, depending on presence or absence of a passenger in the vehicle 5. For example, in a case where the passenger tends to have motion sickness, the message suggesting the use of the vehicle function relating to motion of the vehicle 5 may not be provided.

Further, a function described as one block in the foregoing embodiments is not necessarily implemented by a single physical element but may be implemented by separate physical elements. Moreover, functions described as plural blocks in the foregoing embodiments may be implemented by a single physical element. Moreover, one function may be executed through a process relating to the one function implemented by an in-vehicle apparatus and an apparatus outside the vehicle and through information exchange between those apparatuses via communications.

In the foregoing embodiments, all or a part of the various functions that are described to be implemented by software may be implemented by an electrical hardware circuit. Moreover, a function that is described as a block in the foregoing embodiments may be implemented by cooperation between software and hardware.

While the invention has been shown and described in detail, the foregoing description is in all aspects illustrative and not restrictive. It is therefore understood that numerous other modifications and variations can be devised without departing from the scope of the invention.

What is claimed is:

1. An information providing apparatus that is used in a vehicle, the information providing apparatus comprising:
    a controller configured to:
        (i) acquire traveling environment information indicating a traveling environment of the vehicle;
        (ii) acquire, via a network from a predetermined server that is external of the vehicle, a table that correlates a vehicle function that the vehicle is capable of performing with a determination condition that is used to determine whether or not use of the vehicle function is appropriate;
        (iii) compare the acquired traveling environment information with the determination condition in the table to determine whether the use of the vehicle function is appropriate; and
        (iv) provide, to a user of the vehicle, a message suggesting use of the vehicle function when a result of (iii) determines that the use of the vehicle function is appropriate.

2. The information providing apparatus according to claim 1, further comprising:
    a location acquisition system configured to acquire a current location in which the vehicle is currently located, wherein
    the controller, in (i), acquires the traveling environment information indicating the traveling environment of the acquired current location and, in (ii), acquires the table in which the determination condition has been established according to the acquired current location.

3. The information providing apparatus according to claim 1, further comprising:
    a location derivation system configured to derive a scheduled location through which the vehicle will travel, wherein
    the controller, in (i), acquires the traveling environment information indicating the traveling environment of the derived scheduled location and, in (ii), acquires the table in which the determination condition has been established according to the derived scheduled location.

4. The information providing apparatus according to claim 1, wherein:
    the controller is further configured to activate the vehicle function in a case where the user of the vehicle approves the use of the vehicle function in response to the message provided by the controller in (iv).

5. The information providing apparatus according to claim 4, wherein
    the vehicle includes a plurality of the vehicle functions that are different from each another;
    the controller acquires the determination condition for each of the plurality of the vehicle functions; and
    in a case where (1) the traveling environment indicated by the acquired traveling environment information satisfies the acquired determination condition for any of the plurality of the vehicle functions and (2) the vehicle function corresponding to the satisfied determination condition is a predetermined vehicle function, the controller activates the predetermined vehicle function without first obtaining approval of the user.

6. The information providing apparatus according to claim 1, wherein
    the determination condition is set based on used states of the vehicle function by users of a plurality of vehicles.

7. The information providing apparatus according to claim 1, wherein
    the controller, in (iv), determines whether or not to provide the message suggesting the use of the vehicle function to the user based on a used state of the vehicle function by the user.

8. The information providing apparatus according to claim 7, wherein
    the controller acquires the used state of the vehicle function by the user from the server via the network.

9. A communication system that comprises a server that is external of a vehicle and an information providing apparatus that is used in the vehicle, wherein
    the server is configured to generate a table that correlates a vehicle function that the vehicle is capable of performing with a determination condition that is used to determine whether or not use of the vehicle function is appropriate; and
    the information providing apparatus includes:
    a controller configured to:
        (i) acquire traveling environment information indicating a traveling environment of the vehicle;
        (ii) acquire the table from the server via a network;
        (iii) compare the acquired traveling environment information with the determination condition in the table to determine whether the use of the vehicle function is appropriate; and
        (iv) provide, to a user of the vehicle, a message suggesting use of the vehicle function when a result of (iii) determines that the use of the vehicle function is appropriate.

10. The communication system according to claim 9, wherein
    the server sets the determination condition based on used states of the vehicle function by users of a plurality of vehicles.

11. An information providing method of providing information to a user of a vehicle, the information providing method being executed by a controller of the vehicle and comprising the steps of:
    (a) acquiring traveling environment information indicating a traveling environment of the vehicle;
    (b) acquiring, via a network from a predetermined server that is external of the vehicle, a table that correlates a vehicle function that the vehicle is capable of performing with a determination condition that is used to determine whether or not use of the vehicle function is appropriate;

(c) comparing the acquired traveling environment information with the determination condition in the table to determine whether the use of the vehicle function is appropriate; and (d) when a result of (c) determines that the use of the vehicle function is appropriate, providing a message to the user of the vehicle, the message suggesting the use of the vehicle function.

12. The information providing method according to claim 11, further comprising the step of:

(e) acquiring a current location in which the vehicle is currently located, wherein
the step (a) acquires the traveling environment information indicating the traveling environment of the acquired current location and the step (b) acquires the table in which the determination condition has been established according to the acquired current location.

13. The information providing method according to claim 11, further comprising the step of:

(e) deriving a scheduled location through which the vehicle will travel, wherein
the step (a) acquires the traveling environment information indicating the traveling environment of the derived scheduled location and the step (b) acquires the table in which the determination condition has been established according to the derived scheduled location.

14. The information providing method according to claim 11, further comprising the step of:

(f) in a case where the user of the vehicle approves the use of the vehicle function in response to the message provided by the step (d), activating the vehicle function.

15. The information providing method according to claim 14, wherein
the vehicle includes a plurality of the vehicle functions that are different from each another;
the step (b) acquires the determination condition for each of the plurality of the vehicle functions; and
in a case where (1) the traveling environment indicated by the traveling environment information satisfies the acquired determination condition for any of the plurality of the vehicle functions and (2) the vehicle function corresponding to the satisfied determination condition is a predetermined vehicle function, the step (f) activates the predetermined vehicle function without first obtaining approval of the user.

16. The information providing method according to claim 11, wherein
the determination condition is set based on used states of the vehicle function by users of a plurality of vehicles.

17. The information providing method according to claim 11, wherein
the step (d) determines whether or not to provide the message suggesting the use of the vehicle function to the user based on a used state of the vehicle function by the user.

18. The information providing method according to claim 17, wherein
the step (d) acquires the used state of the vehicle function by the user from the server via the network.

* * * * *